UNITED STATES PATENT OFFICE.

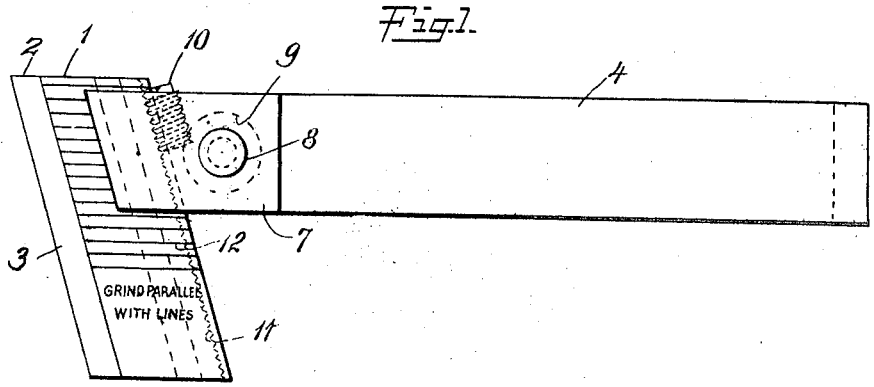
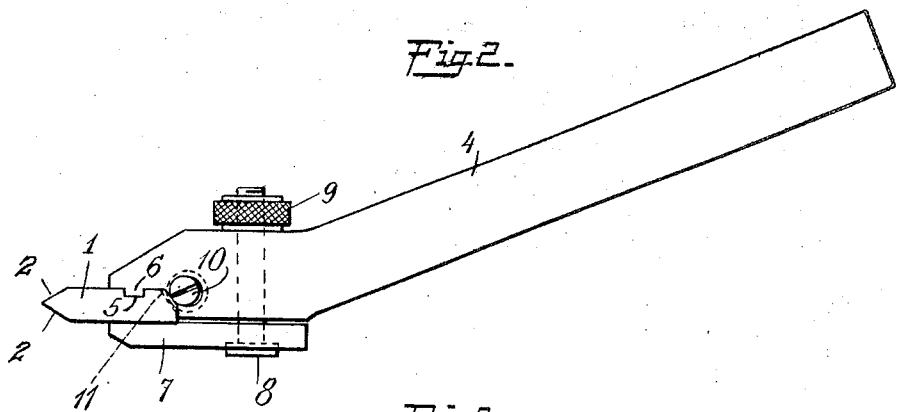
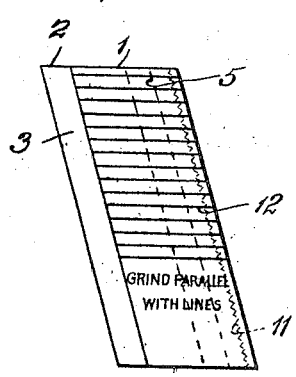
INVENTOR
Alfred E. Carter
BY S. Jay Teller
ATTORNEY

ALFRED E. CARTER, OF PROVIDENCE, RHODE ISLAND, ASSIGNOR TO PRATT & WHITNEY COMPANY, OF NEW YORK, N. Y., A CORPORATION OF NEW JERSEY.

CUTTING-TOOL.

1,299,125.  Specification of Letters Patent.  Patented Apr. 1, 1919.

Application filed February 11, 1918. Serial No. 216,640.

*To all whom it may concern:*

Be it known that I, ALFRED E. CARTER, a citizen of the United States, residing at Providence, in the county of Providence and State of Rhode Island, have invented certain new and useful Improvements in Cutting-Tools, of which the following is a specification.

The invention relates particularly to metal cutting tools of the type in which each has its cutting face formed with a definite predetermined contour and is provided with a similar contour at surfaces of intersection back of the initial cutting face. The invention is particularly applicable to lathe tools, such for instance as single point threading tools.

The object of the invention is to provide such tools with surface markings, preferably parallel lines, which are adapted to be used for guidance in grinding the tools to sharpen them. The cross sectional contour of such a tool is correct along the lines of intersection of certain surfaces back of the initial cutting plane, these surfaces usually being planes parallel to the initial cutting face. Therefore, in order that the correct contour may be available, it is necessary to grind the tool along one of the said surfaces or parallel planes.

Inasmuch as the invention is particularly well adapted to a single point threading tool, I have shown such a tool in the drawing. It will be understood, however, that the invention can be otherwise embodied and that the drawing is intended to be merely illustrative and is not intended to define or limit the scope of the invention, the accompanying claims being relied upon for that purpose. The drawing shows a tool which is detachably mounted in a holder, but it is particularly pointed out that the invention is not so limited.

Of the drawing:

Figure 1 is a side view.

Fig. 2 is a plan view.

Fig. 3 is a side view of the tool detached from the holder.

The single point threading tool shown in the drawing is provided with a cutting face 1 which has a contour corresponding to that of the threads to be cut. As illustrated, there are two cutting edges 2, 2 which meet at a point, the tool being thus adapted for cutting V-threads. The tool is provided with lateral faces of suitable form and with relief faces 3, 3 which are inclined at a predetermined angle to the cutting face 1. With a contour such as that shown the two relief faces 3, 3 join the cutting face 1 along the cutting edges 2, 2.

The tool is preferably detachably mounted in a holder 4 so as to be adjustable therein. As illustrated, the tool is provided with a longitudinal groove 5 in which fits a tongue 6 formed on the holder 4. The tool is held in place by a plate 7 which is adapted to be clamped by a bolt 8 having a nut 9. The tool is longitudinally adjustable, being guided by the tongue and groove construction at 5 and 6. Preferably, for effecting longitudinal adjustment of the tool and for assisting in locking it after adjustment, there is provided a screw 10 which fits fragmentary screw threads in the tool at 11.

For cutting standard threads it is essential that the cutting edges 2 be at the proper angle to each other and the tool is so constructed that the angle is correct when the top surface or cutting face 1 of the tool is at a predetermined angle to the longitudinal lines of the relief faces 3, 3. Obviously, if the angle of the top plane be changed the angle between the cutting edges will be correspondingly changed, thus making the tool unfit for cutting standard threads.

When tools of this type are initially constructed at the factory the cutting face is ground to the proper angle to provide the required effective contour. But it has been found that in practice operators frequently carelessly resharpen the tool in such a way as to change the angle of the cutting face, thus making the effective contour of the tool incorrect. The correct contour can be maintained only by grinding the tool in such a way as to maintain the cutting face always at the proper angle and in parallelism with the initial cutting face.

To guide the operator in regrinding the tool from time to time, I provide suitable markings. Preferably these markings are in the form of a series of lines 12 which are parallel to each other and parallel with the initial cutting face of the tool. These markings or lines are located at the side of the tool, preferably on one of the lateral faces thereof, as shown. The operator, by observing the lines, can so grind the tool as to maintain the cutting face in parallelism with them. A plurality of lines is provided so that the tool can be ground many times. When the tool has been ground so as to obliterate the uppermost line the operator can then be guided by the next line, and so on until the tool is reduced to its minimum length.

What I claim is:

1. A metal cutting tool having a cutting face with a predetermined contour differing from a single straight line, and having relief faces at an angle to the cutting face, the cross sectional contour of the tool being the same as the said predetermined contour at a plurality of surfaces of intersection back of the initial cutting face and the tool at one side having markings thereon for guidance in grinding along any one of the said surfaces.

2. A lathe tool having a plane cutting face with a predetermined contour differing from a single straight line and having relief faces at an angle to the cutting face, the cross sectional contour of the tool being the same as the said predetermined contour at all planes of intersection parallel to the initial cutting face and the tool at one side having markings thereon for guidance in grinding along any one of the said parallel planes.

3. A lathe tool having a cutting face with a predetermined contour differing from a single straight line and having plane relief faces at an angle to the cutting face, the said tool at one side having a series of parallel lines thereon for guidance in maintaining the cutting face in parallelism as it is ground backward whereby the angle between the cutting face and the relief faces is maintained the same.

4. A single point threading tool having a cutting face with a predetermined thread contour and having plane relief faces at an angle to the cutting face, the said tool at one side having a series of parallel lines thereon for guidance in maintaining the cutting face in parallelism as it is ground backward.

In testimony whereof, I hereto affix my signature.

ALFRED E. CARTER. [L. S.]

Witness to signature:
MARIANO C. CORRENTE.